Patented Oct. 2, 1923.

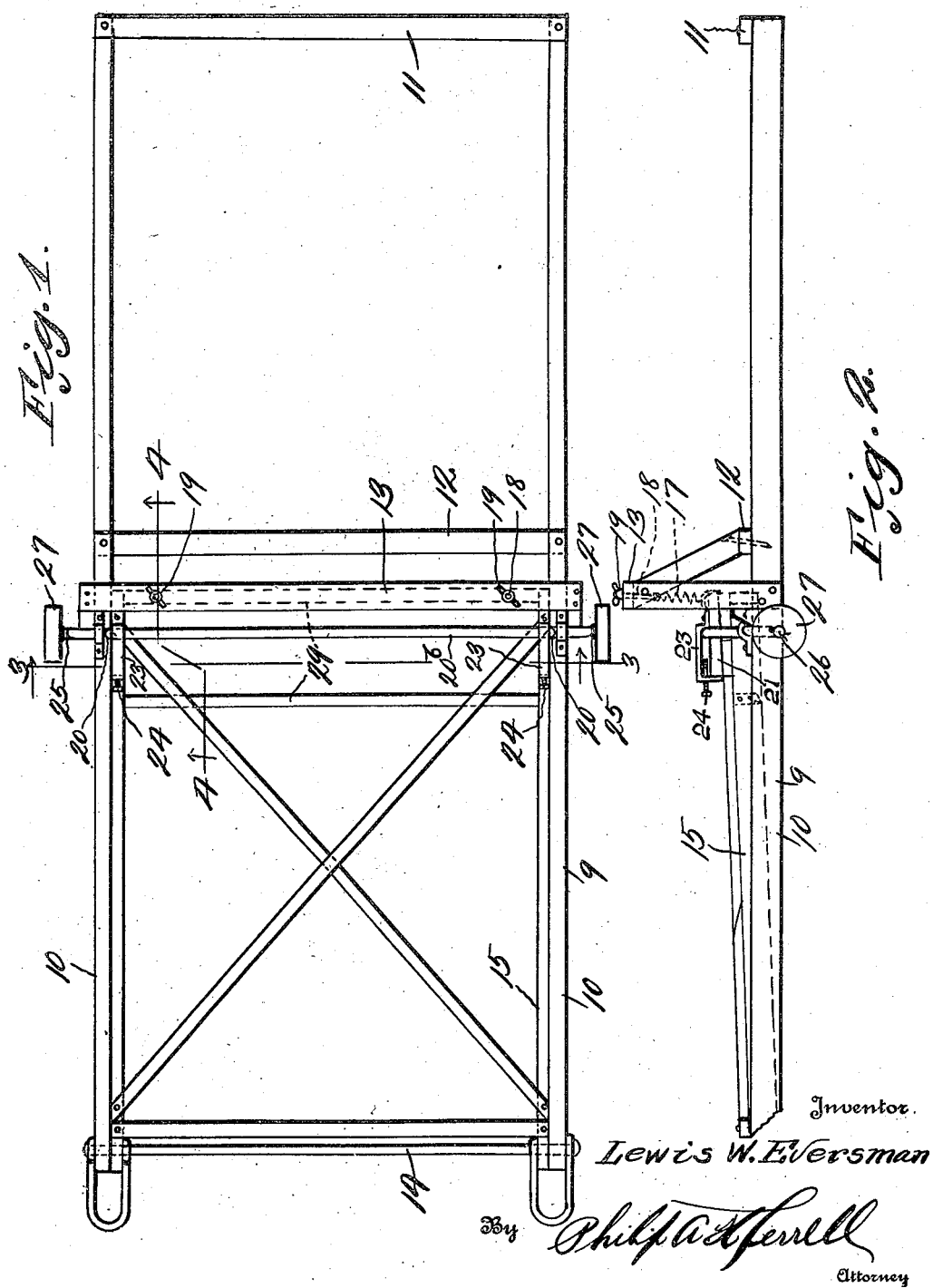

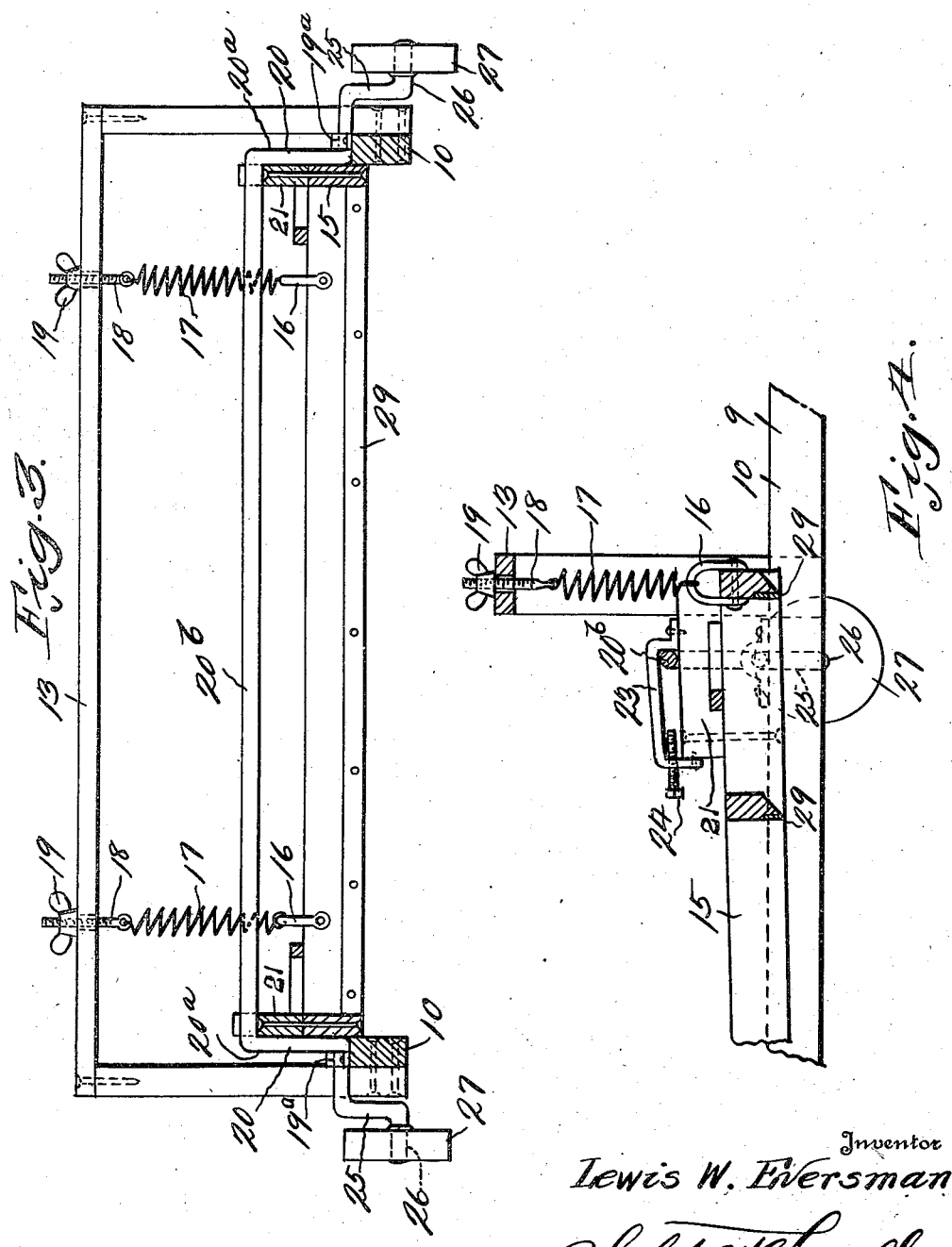

1,469,502

UNITED STATES PATENT OFFICE.

LEWIS W. EVERSMAN, OF JULESBURG, COLORADO.

AUTOMATIC LEVELING MACHINE.

Application filed May 31, 1922. Serial No. 564,907.

*To all whom it may concern:*

Be it known that LEWIS W. EVERSMAN, citizen of the United States, residing at Julesburg, in the county of Sedgwick and State of Colorado, has invented certain new and useful Improvements in Automatic Leveling Machines, of which the following is a specification, reference being had therein to the accompanying drawings.

The invention relates to new and useful improvements in leveling machines and particularly to machines for leveling or grading land or roads.

A further object of the invention is to provide a device of this character which is simple in construction and which is automatic in its operation upon movement in one direction.

A further object is to provide a device of this character which includes a main frame supported by wheels, a pivoted scraping frame mounted in the main frame, and means actuated by the axle of the wheels which support the main frame for moving the scraping frame into scraping position when the main frame is moved in a forward direction.

A further object is to provide means for depressing the scraping frame into scraping position and which is adjustable to regulate the scraping action of the scraper.

With the above and other objects in view the invention resides in the combination and arrangement of parts, hereinafter described, it being understood that changes in the precise embodiment of the invention may be made within the scope of what is claimed without departing from the spirit of the invention.

In the drawing:—

Figure 1 is a top plan view of the device.

Figure 2 is a side elevation of a leveling machine made in accordance with the invention.

Figure 3 is a vertical transverse sectional view taken on line 3—3 of Figure 1.

Figure 4 is a detail sectional view taken on the line 4—4 of Figure 1.

Referring to the drawing, there is shown a main frame 9 including the longitudinal side bars 10, with the rear transverse connecting bar 11, and the intermediate transverse connecting bar 12.

Erected on the intermediate portion of the frame and extending transversely thereof is a frame 13. Disposed transversely of the frame and through the forward ends of the side bars 10, is a shaft 14, and pivotally supported on this shaft, at its forward end is a frame 15, the rear end of which is disposed directly beneath the elevated frame 13. Carried by the rear end of the frame 15, are the clevises 16, to which are connected the lower ends of the springs 17. The upper ends of the springs are connected to the lower ends of the bolts 18, which pass upwardly through the elevated frame 13, and have on their upper ends the adjusting wing nuts 19, by means of which the tension of the springs may be regulated so as to hold the rear end of the frame 15 at different elevations.

Mounted for rocking movement in bearing 19ª, on each side of the main frame 9 and on the bars 10, are the L-shaped members 20, the vertical portions 20ª of which are connected together by the bar 20ᵇ which is slidable on blocks 21 carried by the frame 15. Secured to the blocks 21 and arching the bar 20ᵇ are guide bars 23. The guide bars have threaded in their forward ends screws which may be adjusted for limiting the forward movement of the bar 20ᵇ thereby limiting the downward movement of the free end of the frame for adjusting the depth of cut.

Carried by the outer ends of the horizontal portion of each member 20 is a downwardly and outwardly extending arm 25 on the horizontal portions 26 of which ground engaging wheels are mounted.

Normally the springs 17 hold the rear end of the frame 15 elevated so that the scraper blades 29, carried by the rear end of the frame 15, will be out of contact with the ground. When the main frame is drawn forwardly the L-shaped members 20 will be rocked so that the wheels 27 will be swung rearwardly and upwardly from the ground and the bar 20ᵇ brought to bear downwarly on the blocks 21 so as to depress the rear end of the frame 15 against the tension of the springs 17, and thus bring the scraper blades 29 into scraping position with relation to the ground. The device is thus automatic in its operation to bring the scrapers into operative position when the machine is drawn forwardly, continual forward movement maintaining the scraper in such position.

The invention having been set forth what is claimed as new and useful is:—

1. A leveling machine comprising a main frame, a scraper frame movably mounted in the main frame, resilient means supporting one end of the movable frame out of scraping position, an arched axle mounted for rocking movement in the main frame and having ground wheels thereon, said axle being arranged to engage and depress the movable frame into scraping position upon movement of the main frame in one direction.

2. A land leveling and grading machine comprising a main frame, a scraper frame pivotally supported in the main frame, resilient means supporting the free end of the pivoted frame out of scraping position, angular members pivotally supported at each side of the main frame, guide wheels on the angular members, a transverse bar connecting the angular members and arranged to engage and depress the free end of the pivoted frame to depress the said frame upon movement of the main frame and means cooperating with the transverse bar for limiting the movement thereof.

In testimony whereof I hereunto affix my signature.

LEWIS W. EVERSMAN.